(12) United States Patent
Zhang et al.

(10) Patent No.: US 11,546,791 B2
(45) Date of Patent: Jan. 3, 2023

(54) METHOD FOR PROVIDING MAXIMUM UPLINK DUTY CYCLE PERCENTAGE, USER EQUIPMENT AND NETWORK NODE

(71) Applicant: GUANGDONG OPPO MOBILE TELECOMMUNICATIONS CORP., LTD., Guangdong (CN)

(72) Inventors: Zhi Zhang, Dongguan (CN); Jinqiang Xing, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 99 days.

(21) Appl. No.: 17/071,944

(22) Filed: Oct. 15, 2020

(65) Prior Publication Data
US 2021/0029574 A1    Jan. 28, 2021

Related U.S. Application Data

(63) Continuation of application No. PCT/CN2019/083287, filed on Apr. 18, 2019.

(60) Provisional application No. 62/660,335, filed on Apr. 20, 2018.

(51) Int. Cl.
*H04W 72/00* (2009.01)
*H04W 24/10* (2009.01)
(Continued)

(52) U.S. Cl.
CPC ......... *H04W 24/10* (2013.01); *H04W 72/005* (2013.01); *H04W 72/0413* (2013.01);
(Continued)

(58) Field of Classification Search
CPC ............. H04W 72/0413; H04W 76/27; H04W 72/1284; H04W 74/004; H04B 17/309; H04L 17/309
See application file for complete search history.

(56) References Cited

U.S. PATENT DOCUMENTS

2012/0044842 A1* 2/2012 Nammi ............. H04W 72/1205
370/281
2016/0050658 A1* 2/2016 Tabet ................... H04L 5/0048
370/329
(Continued)

FOREIGN PATENT DOCUMENTS

CN    107528957 A    12/2017
WO    2017197096 A1  11/2017

OTHER PUBLICATIONS

R4-1804016, "Discussion on solutions to satisfy SAR requirements for NR HPUE", Apr. 16-20, 2018, pp. 1-4 (Year: 2018).*
(Continued)

*Primary Examiner* — Salvador E Rivas
(74) *Attorney, Agent, or Firm* — Ladas & Parry, LLP

(57) ABSTRACT

An apparatus and a method for providing measurement information are provided. The method for providing measurement information of a user equipment (UE) includes measuring an uplink duty cycle percentage within a measurement duration, wherein the measurement duration is one of a configuration duration form a network node, a default duration, and a pre-defined duration, and reporting a maximum uplink duty cycle percentage according to a measured uplink duty cycle percentage within the measurement duration.

16 Claims, 2 Drawing Sheets

200

202

Measuring an uplink duty cycle percentage within a measurement duration, wherein the measurement duration is one of a configuration duration form a network node, a default duration, and a pre-defined duration

204

Reporting a maximum uplink duty cycle percentage according to a measured uplink duty cycle percentage within the measurement duration

(51) Int. Cl.
  *H04W 76/27* (2018.01)
  *H04W 72/04* (2009.01)
  *H04W 72/12* (2009.01)
  *H04W 74/00* (2009.01)
  *H04B 17/309* (2015.01)

(52) U.S. Cl.
  CPC ... *H04W 72/0446* (2013.01); *H04W 72/1284* (2013.01); *H04W 74/004* (2013.01); *H04W 76/27* (2018.02); *H04B 17/309* (2015.01)

(56) References Cited

U.S. PATENT DOCUMENTS

| | | | | |
|---|---|---|---|---|
| 2016/0309354 | A1* | 10/2016 | Yerramalli | H04W 24/02 |
| 2016/0337165 | A1* | 11/2016 | Mujtaba | H04W 52/0251 |
| 2017/0105178 | A1* | 4/2017 | Chirikov | H04W 52/0232 |
| 2017/0332333 | A1 | 11/2017 | Santhanam et al. | |
| 2020/0128491 | A1* | 4/2020 | Drugge | H04W 52/143 |

OTHER PUBLICATIONS

OPPO: "Discussion on HPUE NR TDD UL DL configurations", 3GPP Draft; R4-1801584, 3rd Generation Partnership Project (3GPP), Mobile Competence Centre; 650, Route Des Lucioles; F-06921 Sophia-Antipolis Cedex; France, vol. RAN WG4,No. Athens,GR; Feb. 26, 2018-Mar. 2, 2018, Feb. 14, 2018 (Feb. 14, 2018), XP051401947, entire document.

Supplementary European Search Report in the European application No. 19787887.9, dated Apr. 29, 2021.

International Search Report in the international application No. PCT/CN2019/083287, dated Jul. 17, 2019.

OPPO. "Further discussion on UL/DL configurations for NR HPUE" 3GPP TSG-RAN WG4 Meeting #86bis, R4-1803659, Apr. 6, 2018 (Apr. 6, 2018), entire document.

VIVO."Discussion on NR TDD UL/DL configurations and HPUE behaviour" 3GPP TSG-RAN WG4 AdHoc 1801, R4-1800414, Jan. 26, 2018 (Jan. 26, 2018), the entire document.

CMCC. "Discussion on solutions to satisfy SAR requirements for NR HPUE" 3GPP TSG-RAN WG4 Meeting #86bis, R4-1804016, Apr. 5, 2018 (Apr. 5, 2018), the whole document.

Written Opinion of the international Search Authority in the international application No. PCT/CN2019/083287, dated Jul. 17, 2019.

Office Action of the Indian application No. 202027049538, dated Dec. 16, 2021.

First Office Action of the European application No. 19787887.9, dated Feb. 1, 2022.

Second Office Action of the European application No. 19787887.9, dated Sep. 13, 2022.

\* cited by examiner

METHOD FOR PROVIDING MAXIMUM UPLINK DUTY CYCLE PERCENTAGE, USER EQUIPMENT AND NETWORK NODE

CROSS-REFERENCE TO RELATED APPLICATION

This is a continuation application of International Patent Application No. PCT/CN2019/083287, filed on Apr. 18, 2019, entitled "Apparatus and Method for Providing Measurement Information", which claims priority from U.S. Patent Application No. 62/660,335, filed on Apr. 20, 2018, the disclosures of which are hereby incorporated by reference in their entireties.

BACKGROUND OF DISCLOSURE

An importance of new radio (NR) uplink (UL)/downlink (DL) ratio for a high power user equipment (HPUE) (e.g., transmission power is 26 dBm or more) comes from a specific absorption rate (SAR) testing. The SAR testing is a test to measure a UE radiation level from health and environmental perspectives. In long term evolution (LTE), to guarantee that HPUE phones can pass the SAR testing, UL/DL ratio can not exceed 50%, which comes from a fact that 50% UL/DL ratio with 26 dBm transmission power is equivalent to frequency division duplexing (FDD) with 23 dBm transmission power for a normal UE in the SAR testing. In LTE, an applicability of the HPUE to time division duplexing (TDD) UL/DL configurations is restricted from 1 to 5 only, which is described in a current 3rd generation partnership project (3GPP) specification.

However, situation becomes quite different for NR. In NR, slot formats are far more flexible than those of LTE.

Therefore, there is a need for an apparatus and a method for providing measurement information in NR.

SUMMARY

The present disclosure relates to the field of communication systems, and more particularly, to an apparatus and a method for providing measurement information.

In a first aspect of the present disclosure, a user equipment (UE) for providing measurement information includes a memory, a transceiver, and a processor coupled to the memory and the transceiver. The processor is configured to measure an uplink duty cycle percentage within a measurement duration, wherein the measurement duration is one of a configuration duration form a network node, a default duration, and a pre-defined duration. The processor is configured to control the transceiver to report a maximum uplink duty cycle percentage according to a measured uplink duty cycle percentage within the measurement duration.

In a second aspect of the present disclosure, a method for providing measurement information of a user equipment includes measuring an uplink duty cycle percentage within a measurement duration, wherein the measurement duration is one of a configuration duration form a network node, a default duration, and a pre-defined duration, and reporting a maximum uplink duty cycle percentage according to a measured uplink duty cycle percentage within the measurement duration.

In a third aspect of the present disclosure, a network node for providing measurement information includes a memory, a transceiver, and a processor coupled to the memory and the transceiver. The processor is configured to configure, to a user equipment (UE), a measurement indication, wherein the measurement indication indicates the UE to measure an uplink duty cycle percentage within a measurement duration, and the measurement duration is a configuration duration by the processor. The processor is configured to control the transceiver to receive a maximum uplink duty cycle percentage from the UE, wherein the maximum uplink duty cycle percentage is according to a measured uplink duty cycle percentage within the measurement duration.

In a fourth aspect of the present disclosure, a method for providing measurement information of a network node includes configuring, to a user equipment (UE), a measurement indication, wherein the measurement indication indicates the UE to measure an uplink duty cycle percentage within a measurement duration, and the measurement duration is a configuration duration by the network node, and receiving a maximum uplink duty cycle percentage from the UE, wherein the maximum uplink duty cycle percentage is according to a measured uplink duty cycle percentage within the measurement duration.

In a fifth aspect of the present disclosure, a non-transitory machine-readable storage medium has stored thereon instructions that, when executed by a computer, cause the computer to perform the above method.

In a sixth aspect of the present disclosure, a terminal device includes a processor and a memory configured to store a computer program. The processor is configured to execute the computer program stored in the memory to perform the above method.

In a seventh aspect of the present disclosure, a network node includes a processor and a memory configured to store a computer program. The processor is configured to execute the computer program stored in the memory to perform the above method.

BRIEF DESCRIPTION OF DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION OF EMBODIMENTS

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

Figure 1:
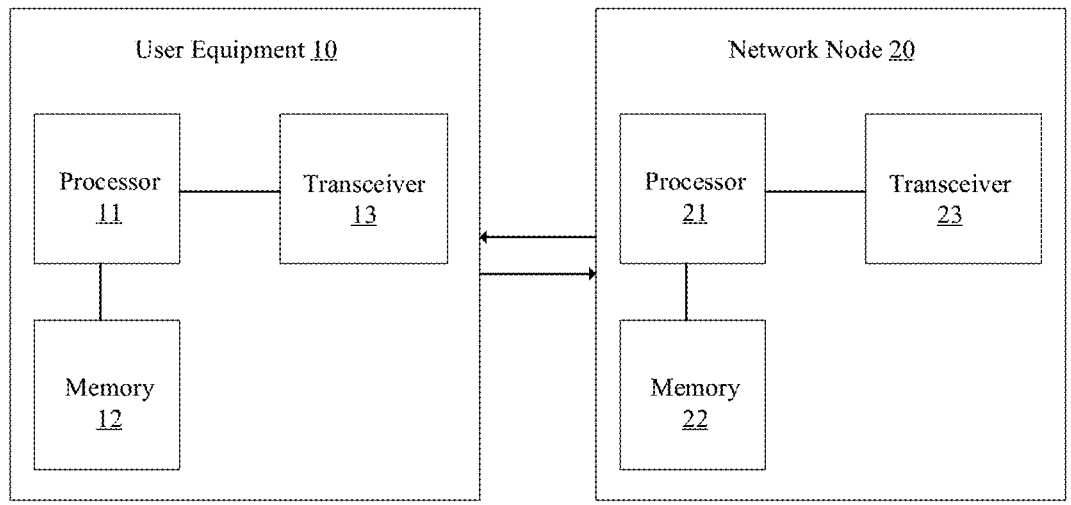
FIG. 1 is a block diagram of a user equipment and a network node for providing measurement information according to an embodiment of the present disclosure.

FIG. 1 illustrates that, in some embodiments, a user equipment (UE) 10 and a network node 20 for providing measurement information according to an embodiment of the present disclosure are provided. The UE 10 may include a processor 11, a memory 12, and a transceiver 13. The network node 20 may include a processor 21, a memory 22 and a transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21, and the transceiver 13 or 23 transmits and/or receives a radio signal.

The processor 11 or 21 may include an application-specific integrated circuit (ASIC), other chipsets, logic circuit and/or data processing devices. The memory 12 or 22 may include a read-only memory (ROM), a random access memory (RAM), a flash memory, a memory card, a storage medium and/or other storage devices. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21, in which those can be communicatively coupled to the processor 11 or 21 via various means are known in the art.

The communication between UEs relates to vehicle-to-everything (V2X) communication including vehicle-to-vehicle (V2V), vehicle-to-pedestrian (V2P), and vehicle-to-infrastructure/network (V2I/N) according to a sidelink technology developed under 3rd generation partnership project (3GPP) release 14, 15, and beyond. UEs communicate with each other directly via a sidelink interface such as a PC5 interface.

In some embodiments, the processor 11 is configured to measure an uplink duty cycle percentage within a measurement duration. The measurement duration is one of a configuration duration form the network node 20, a default duration, and a pre-defined duration. The processor 11 is configured to control the transceiver 13 to report a maximum uplink duty cycle percentage according to a measured uplink duty cycle percentage within the measurement duration.

In some embodiments, the measuring further includes determining whether an actual uplink duty cycle exceeds an ability value or a value the transceiver 13 reports. In detail, the ability value can be a default value, such as 50 percent.

In some embodiments, the measurement duration is in a unit of ms, slot, or symbol. In details, the measurement duration can be 0.5 ms, 1 ms, 5 ms, 10 ms, more than 10 ms, 1 slot, 10 slots, more than 10 slots, 7 symbols, 70 symbols, or more than 70 symbols.

In some embodiments, the configuration duration is a cell specific duration or a UE specific duration. In some embodiments, when the transceiver 13 receives a broadcasting signaling indicating the cell specific duration from the network node 20, the processor 11 uses the same configuration duration with another UE in a cell. In some embodiments, when the transceiver 13 receives a radio resource control (RRC) signaling indicating the UE specific duration from the network node 20, the processor 11 uses a different configuration duration from another UE in a cell.

In some embodiments, the processor 21 is configured to configure, to the user equipment (UE) 10, a measurement indication. The measurement indication indicates the UE 10 to measure an uplink duty cycle percentage within a measurement duration, and the measurement duration is a configuration duration by the processor 21. The processor 21 is configured to control the transceiver 23 to receive a maximum uplink duty cycle percentage from the UE 10. The maximum uplink duty cycle percentage is according to a measured uplink duty cycle percentage within the measurement duration.

In some embodiments, the measuring further includes determining whether an actual uplink duty cycle exceeds an ability value or a value the UE 10 reports. In detail, the ability value can be a default value, such as 50 percent.

In some embodiments, the measurement duration is in a unit of ms, slot, or symbol. In details, the measurement duration can be 0.5 ms, 1 ms, 5 ms, 10 ms, more than 10 ms, 1 slot, 10 slots, more than 10 slots, 7 symbols, 70 symbols, or more than 70 symbols.

In some embodiments, the configuration duration is a cell specific duration or a UE specific duration. In some embodiments, the processor 21 is configured to use a broadcasting signaling to configure, to all UEs in a cell, the same configuration duration. In some embodiments, the processor 21 is configured to use a radio resource control (RRC) signaling to configure, to different UEs in a cell, different configuration durations.

Figure 2:
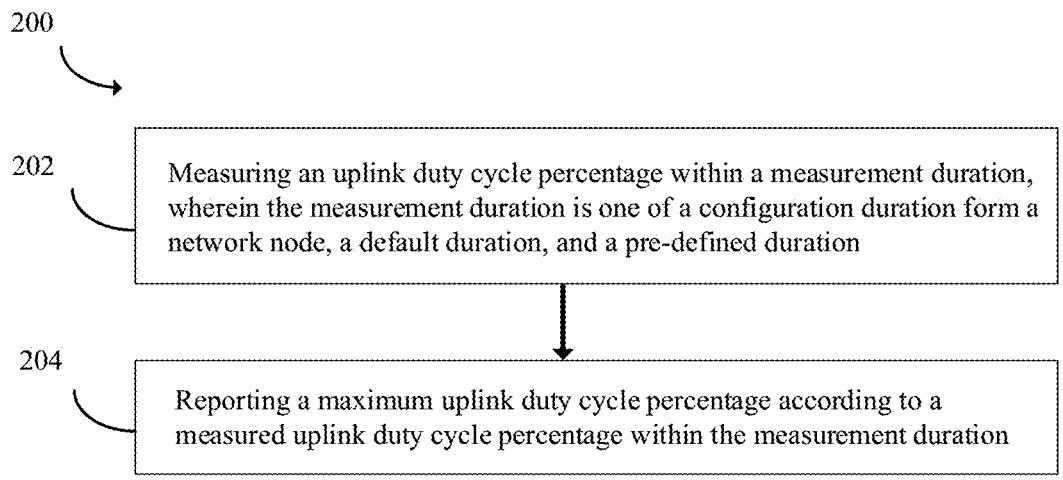
FIG. 2 is a flowchart illustrating a method for providing measurement information of a user equipment according to an embodiment of the present disclosure.

FIG. 2 illustrates a method 200 for providing measurement information of a user equipment according to an embodiment of the present disclosure. The method 200 includes: a block 202, measuring an uplink duty cycle percentage within a measurement duration, wherein the measurement duration is one of a configuration duration form a network node, a default duration, and a pre-defined duration, and a block 204, reporting a maximum uplink duty cycle percentage according to a measured uplink duty cycle percentage within the measurement duration.

In some embodiments, the measuring further includes determining whether an actual uplink duty cycle exceeds an ability value or a value the UE 10 reports. In detail, the ability value can be a default value, such as 50 percent.

In some embodiments, the measurement duration is in a unit of ms, slot, or symbol. In details, the measurement duration can be 0.5 ms, 1 ms, 5 ms, 10 ms, more than 10 ms, 1 slot, 10 slots, more than 10 slots, 7 symbols, 70 symbols, or more than 70 symbols.

In some embodiments, the configuration duration is a cell specific duration or a UE specific duration. In some embodiments, when the UE 10 receives a broadcasting signaling indicating the cell specific duration from the network node 20, the UE 10 uses the same configuration duration with another UE in a cell. In some embodiments, when the UE 10 receives a radio resource control (RRC) signaling indicating the UE specific duration from the network node 20, the UE 10 uses a different configuration duration from another UE in a cell.

Figure 3:
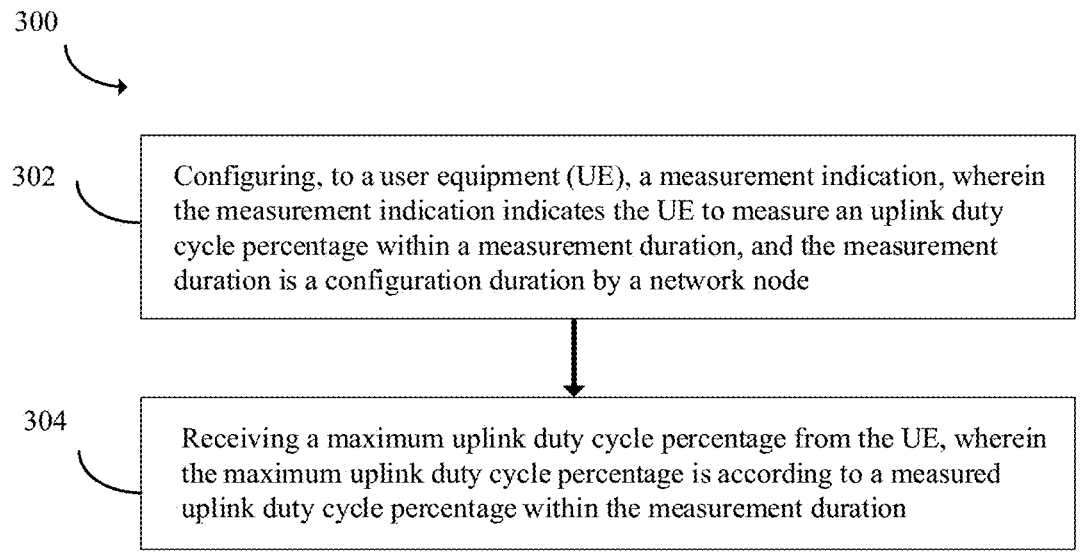
FIG. 3 is a flowchart illustrating a method for providing measurement information of a network node according to an embodiment of the present disclosure.

FIG. 3 illustrates a method 300 for providing measurement information of a network node according to an embodiment of the present disclosure. The method 300 includes: a block 302, configuring, to a user equipment (UE), a measurement indication, wherein the measurement indication indicates the UE to measure an uplink duty cycle percentage within a measurement duration, and the measurement duration is a configuration duration by the network node, and a block 304, receiving a maximum uplink duty cycle percentage from the UE, wherein the maximum uplink duty cycle percentage is according to a measured uplink duty cycle percentage within the measurement duration.

In some embodiments, the measuring further includes determining whether an actual uplink duty cycle exceeds an ability value or a value the UE 10 reports. In detail, the ability value can be a default value, such as 50 percent.

In some embodiments, the measurement duration is in a unit of ms, slot, or symbol. In details, the measurement duration can be 0.5 ms, 1 ms, 5 ms, 10 ms, more than 10 ms, 1 slot, 10 slots, more than 10 slots, 7 symbols, 70 symbols, or more than 70 symbols.

In some embodiments, the configuration duration is a cell specific duration or a UE specific duration. In some embodiments, the method 300 further includes using a broadcasting signaling to configure, to all UEs in a cell, the same configuration duration. In some embodiments, the method 300 further includes using a radio resource control (RRC) signaling to configure, to different UEs in a cell, different configuration durations.

In some embodiments, to solve issues of the prior art, a solution of the embodiment enables the UE 10 to report the maximum uplink (UL) duty cycle percentage that the UE 10 can accept. With this report, the UE 10 is required to measure the UL duty cycle percentage within the above the measurement duration.

In some embodiments, the networks configures an exact measurement duration within which the UE 10 (e.g., high power user equipment (HPUE)) measures if the actual UL duty cycle exceeds its ability (default value, 50% for example) or a value the UE 10 reports. The configured duration can be in the unit of ms, for example 0.5 ms, 1 ms, 5 ms, 10 ms, or longer. It can also be the unit of slot or symbol. For example, it can be 1 slot, 10 slots, or more slots, and it can also be 7 symbols, 70 symbols, or more symbols.

In some embodiments, the network node 20 can configure the measurement duration in a cell specific way, i.e., the network node 20 uses broadcast signaling to configure all HPUEs in a cell using the same value. The network node 20 can also configure the measurement duration in a UE specific way, i.e., different HPUEs in a cell can be configured with different measurement duration, such as using RRC signaling.

In some embodiments, if the network node 20 does not configure the measurement duration, there can be a default value or vale pre-defined in a 3GPP specification.

In some embodiments, if the network node 20 can configure such measurement duration, there could be a flexibility for the network node 20. For example, if the network node 20 does not change a slot format frequently, the network node 20 can configure a short duration for the HPUE, such as 1 ms, which is easy for UE side buffering smaller information about scheduling. If the network node 20 changes the slot format frequently, especially if the network node 20 changes the percentage of UL duty cycle dramatically, the network node 20 can configure a longer duration, such as 100 ms or even longer, this can give more scheduling flexibility for the network node 20.

Figure 4:
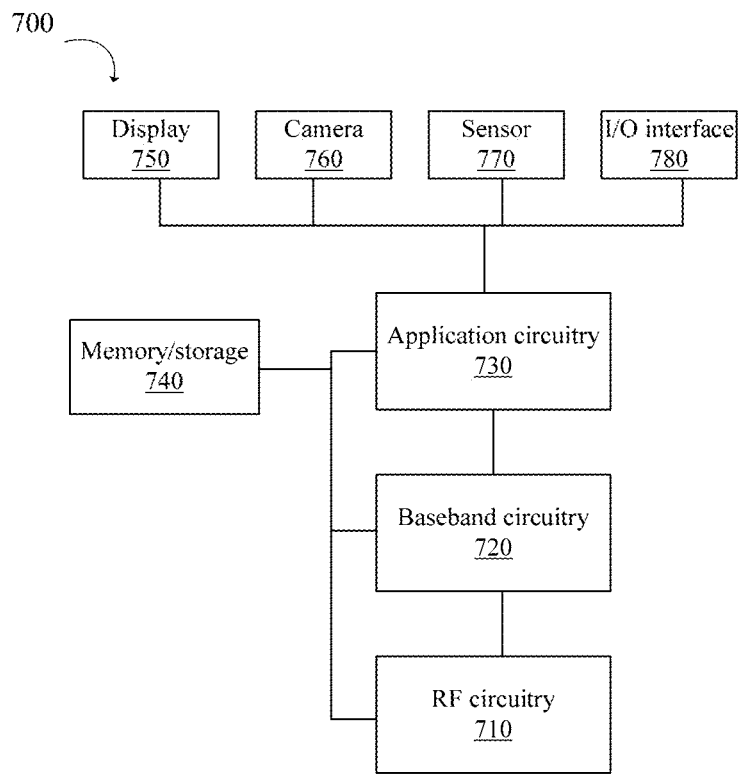
FIG. 4 is a block diagram of a system for wireless communication according to an embodiment of the present disclosure.

FIG. 4 is a block diagram of an example system 700 for wireless communication according to an embodiment of the present disclosure. Embodiments described herein may be implemented into the system using any suitably configured hardware and/or software. FIG. 4 illustrates the system 700 including a radio frequency (RF) circuitry 710, a baseband circuitry 720, an application circuitry 730, a memory/storage 740, a display 750, a camera 760, a sensor 770, and an input/output (I/O) interface 780, coupled with each other at least as illustrated.

The application circuitry 730 may include a circuitry, such as, but not limited to, one or more single-core or multi-core processors. The processors may include any combinations of general-purpose processors and dedicated processors, such as graphics processors and application processors. The processors may be coupled with the memory/storage and configured to execute instructions stored in the memory/storage to enable various applications and/or operating systems running on the system.

The baseband circuitry 720 may include a circuitry, such as, but not limited to, one or more single-core or multi-core processors. The processors may include a baseband processor. The baseband circuitry may handle various radio control functions that enable communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency.

The RF circuitry 710 may enable communication with wireless networks using modulated electromagnetic radiation through a non-solid medium. In various embodiments, the RF circuitry may include switches, filters, amplifiers, etc. to facilitate the communication with the wireless network.

In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, "circuitry" may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules.

In some embodiments, some or all of the constituent components of the baseband circuitry, the application circuitry, and/or the memory/storage may be implemented together on a system on a chip (SOC).

The memory/storage 740 may be used to load and store data and/or instructions, for example, for systems. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, etc. In various embodiments, system may have more or less components, and/or different architectures. Where appropriate, methods described herein may be implemented as a computer program. The computer program may be stored on a storage medium, such as a non-transitory storage medium.

In the embodiment of the present disclosure, an apparatus and a method for providing measurement information capable of providing high reliability are provided. The embodiment of the present disclosure is a combination of techniques/processes that can be adopted in 3GPP specification to create an end product.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan.

A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A user equipment (UE) for providing measurement information, comprising:
    a memory;
    a transceiver; and
    a processor coupled to the memory and the transceiver, wherein the processor is configured to:
    measure an uplink duty cycle percentage within a measurement duration, wherein the measurement duration is a configuration duration from a network node; and
    control the transceiver to report a maximum uplink duty cycle percentage according to a measured uplink duty cycle percentage within the measurement duration,
    wherein the measuring further comprises determining whether an actual uplink duty cycle exceeds a value the transceiver reports.

2. The UE of claim 1, wherein the ability value is a default value.

3. The UE of claim 1, wherein the measurement duration is in a unit of ms, slot, or symbol.

4. The UE of claim 3, wherein the measurement duration is 0.5 ms, 1 ms, 5 ms, 10 ms, more than 10 ms, 1 slot, 10 slots, more than 10 slots, 7 symbols, 70 symbols, or more than 70 symbols.

5. The UE of claim 1, wherein the configuration duration is a cell specific duration or a UE specific duration.

6. The UE of claim 5, wherein when the transceiver receives a broadcasting signaling indicating the cell specific duration from the network node, the processor uses the same configuration duration with another UE in a cell.

7. The UE of claim 5, wherein when the transceiver receives a radio resource control (RRC) signaling indicating the UE specific duration from the network node, the processor uses a different configuration duration from another UE in a cell.

8. A method for providing measurement information of a user equipment (UE), comprising:
  measuring an uplink duty cycle percentage within a measurement duration, wherein the measurement duration is a configuration duration from a network node, a default duration, and a pre-defined duration; and
  reporting a maximum uplink duty cycle percentage according to a measured uplink duty cycle percentage within the measurement duration,
  wherein the measuring further comprises determining whether an actual uplink duty cycle exceeds a value the UE reports.

9. A network node for providing measurement information, comprising:
  a memory;
  a transceiver; and
  a processor coupled to the memory and the transceiver, wherein the processor is configured to:
  configure, to a user equipment (UE), a measurement indication, wherein the measurement indication indicates the UE to measure an uplink duty cycle percentage within a measurement duration, and the measurement duration is a configuration duration by the processor; and
  control the transceiver to receive a maximum uplink duty cycle percentage from the UE, wherein the maximum uplink duty cycle percentage is according to a measured uplink duty cycle percentage within the measurement duration,
  wherein the measuring further comprises determining whether an actual uplink duty cycle exceeds a value the UE reports.

10. The network node of claim 9, wherein the ability value is a default value.

11. The network node of claim 9, wherein the measurement duration is in a unit of ms, slot, or symbol.

12. The network node of claim 11, wherein the measurement duration is 0.5 ms, 1 ms, 5 ms, 10 ms, more than 10 ms, 1 slot, 10 slots, more than 10 slots, 7 symbols, 70 symbols, or more than 70 symbols.

13. The network node of claim 9, wherein the configuration duration is a cell specific duration or a UE specific duration.

14. The network node of claim 13, wherein the processor is configured to use a broadcasting signaling to configure, to all UEs in a cell, the same configuration duration.

15. The network node of claim 13, wherein the processor is configured to use a radio resource control (RRC) signaling to configure, to different UEs in a cell, different configuration durations.

16. A method for providing measurement information of a network node, comprising:
  configuring, to a user equipment (UE), a measurement indication, wherein the measurement indication indicates the UE to measure an uplink duty cycle percentage within a measurement duration, and the measurement duration is a configuration duration by the network node; and
  receiving a maximum uplink duty cycle percentage from the UE, wherein the maximum uplink duty cycle percentage is according to a measured uplink duty cycle percentage within the measurement duration,
  wherein the measuring further comprises determining whether an actual uplink duty cycle exceeds a value the UE reports.

* * * * *